July 17, 1962
J. E. MANN
3,045,150
TIME DELAY CIRCUIT
Filed Oct. 13, 1958
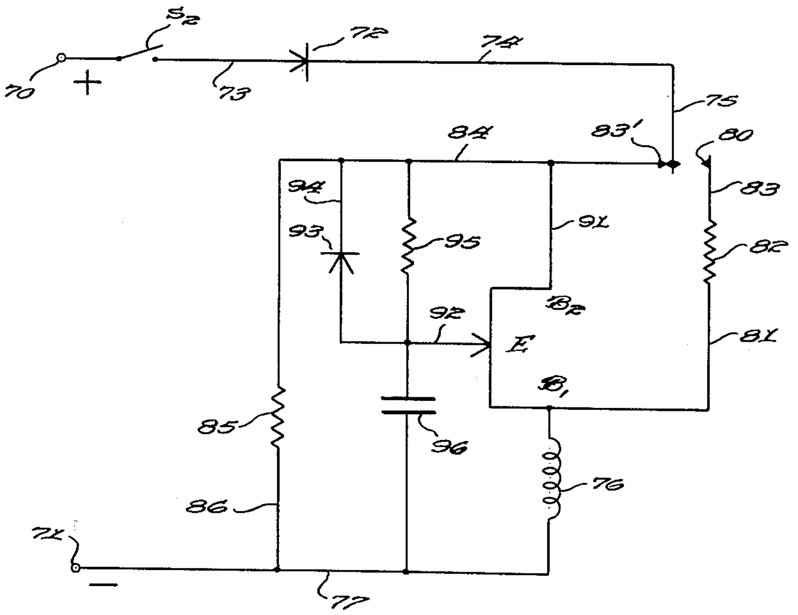
INVENTOR.
John E. Mann.
BY Spensley and Horn
Attys.

United States Patent Office 3,045,150

Patented July 17, 1962

3,045,150

TIME DELAY CIRCUIT

John E. Mann, Pasadena, Calif., assignor, by mesne assignments, to Leach Corp., Compton, Calif., a corporation of California Filed Oct. 13, 1958, Ser. No. 766,878
3 Claims. (Cl. 317—148.5)

This invention relates to a time delay circuit and more particularly to a time delay circuit of improved design for controlling a relay.

Prior art circuits for producing a time delay to energize and deenergize a relay include the use of very high sensitivity relays, such as is described in United States Patent No. 2,801,374 by C. G. Svala entitled "Relay Device," issued July 30, 1957. Such devices are generally expensive and have the further limitation of including a transistor amplifier in the circuit which, under certain conditions, may be burned out.

Other prior art devices include slug relays, thermal relays, transistors, and vacuum tube flip-flop circuits and the like. Most of these prior art devices are temperature and voltage sensitive, Further, the vacuum tube devices generally require a relatively large amount of power.

The present invention improved time delay circuit overcomes the above and other disadvantages existent in the present art devices and circuits.

The present invention time delay circuit makes use of a newly developed "Unijunction Transistor" as a switch which selectively energizes or deenergizes the coil of an ordinary power relay with the time delay being determined by an intermediately coupled RC circuit.

It is an object of the present invention to provide an improved time delay circuit to selectively make or break the contacts of a relay.

Another object of the present invention is to provide an improved time delay circuit using a semiconductor switching element.

Still another object of the present invention is to provide an improved time delay circuit having high reliability.

A further object of the present invention is to provide a time delay circuit for operation of an electromechanical relay which will operate on successive cycles with a minimum of time deviation.

A still further object of the present invention is to provide an improved time delay circuit which has a relatively low power requirement for controlling an electromechanical relay.

Yet a further object of the present invention is to provide an improved time delay circuit for controlling an electromechanical relay, which circuit is not sensitive to ambient temperature nor input voltage fluctuations.

Yet another object of this invention is to provide an improved time delay circuit for controlling an electromechanical relay, which circuit has a low power requirement, is relatively inexpensive and which lends itself to miniaturization.

The novel features which are believed to be characteristic of the present invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing there is shown a schematic view showing a time delay circuit in accordance with an embodiment of the present invention.

Referring now to the drawing, there is shown a presently preferred embodiment of a time delay circuit in accordance with the present invention. This circuit is intended primarily to be used to produce a fixed time delay for a relay after contact is made, i.e., the switch is closed. The input voltage to this circuit is received at input terminals 70 and 71 from a source of D.C. not shown. In this exemplary circuit in accordance with the present invention, 28 volts have been used as the input voltage with the polarity as indicated.

A first diode 72 is in series with the input terminal 70 by interconnection thereto over lead 73. A lead 74 from the other side of diode 72 terminates in movable arm 75 of the relay to be controlled. One end of relay coil 76 is directly coupled to input terminal 71 over lead 77 while the other end thereof is coupled to contact 80 of the relay over lead 81, resistor 82 and lead 83.

The other contact 83' is returned to the input terminal 71 over lead 84, resistor 85 and lead 86. Additional fixed and moving contacts, not shown, may be operated by relay coil 76 and used to switch external circuits when coil 26 is energized after the desired time interval. A unijunction transistor 90, (sometimes called a double base diode) has base $B_1$ thereof directly coupled to the end of relay coil 76 which leads to contact 80. Base $B_2$ of the unijunction transistor is returned to input terminal 70 over lead 91, stationary contact 83', movable contact 75, lead 74, diode 72, lead 73 and switch $S_2$. The emitter of the unijunction transistor is coupled to the input terminal 71 over lead 92, diode 93 and lead 94, through resistor 85 and lead 86. Finally, an RC network consisting of resistor 95 and capacitor 96 is coupled between leads 84 and 77 to effect the desired time delay in the switching of arm 75 after closing of switch $S_2$. That is, the amount of time delay between the time that switch $S_2$ is closed and movable arm 75 switches from fixed contact 83' to fixed contact 80 is dependent upon the charging rate of the capacitor 96 through the resistor 95 in accordance with the well known formula $$Ec=Eb(1-e-t/RC)$$

where $Ec$=voltage across the capacitor, $Eb$=voltage of the source, $t$=time, $R$=value of the resistance, and $C$=value of capacitor. As will hereinafter be explained, the unijunction transistor will not fire until the firing potential $V_p$ is established at junction 91. The firing potential $V_p$ must be greater than the intrinsic stand off ratio ($\eta$) times the voltage across the bases $B_1$, $B_2$ of the unijunction transistor 90 by the amount of the voltage drop of the E–$B_1$ diode, i.e., $V_p=\eta VB_2B_1+VE_1B_1$. This voltage is established by the charging current which flows through resistor 95 into capacitor 96 thus gradually increasing the potential across the capacitor 96, and therefore at junction 91, to a value which exceeds $V_p$.

In operation, the diode 72 acts as a safety device to preclude the possibility of unijunction transistor 90 being burned out by connection of the input terminal to the power supply with an inadvertent reversal in polarity.

Upon closing of the switch $S_2$, 28 volts will appear over lead 73, diode 72, lead 74, arm 75, and contact 83'. This will result in effectively placing 28 volts on the base $B_2$ of the unijunction transistor 90. As the base-to-base resistance of the unijunction transistor is of the order of 5000 ohms, the amount of current flowing through the coil 76 will be negligible at this point in time and thus be insufficient to cause a switching of the contact arm 75 from stationary contact 83' to stationary contact 80. At the same time 28 volts will effectively be impressed across resistor 95 and capacitor 96. Similarly, the same voltage will also appear across resistor 85. Capacitor 96 will be in a state of complete discharge at the moment switch $S_2$ is closed. It will now begin to charge through resistor 95, with the time of charge being determined by the value of resistor 95 and the value of capacitor 96. It will charge toward 28 volts and will reach the voltage $V_p$ (firing potential of unijunction transistor 90) which is determined by the interbase resistance of the unijunction transistor 90. This firing potential will typically be of the order of from 0.52 to 0.75 of the supply voltage of 28 volts plus the voltage drop of the $E-B_1$ diode which is typically of the order of 0.7 volt. Thus, the emitter-$B_1$ diode will become forward biased causing the capacitor 96 to discharge through the relay coil 76. The discharge time is determined by the value of capacitor 96 and the D.C. resistance of the coil 76. The relay must be chosen such that the voltage across coil 76 required to transfer arm 75 from contact 83' to contact 80 is less than the firing potential $V_p$.

The movable contact arm 75 will now transfer to stationary contact 80, thus removing the voltage from lead 84. After the transfer, the coil 76 will still be drawing current, however, from the supply source, through the resistor 82. The unijunction transistor 90 is now effectively out of the circuit. The capacitor 96 will now have a slight positive charge due to the saturation voltage of the $E-B_1$ diode. Thus, junction 91 will be slightly positive and the diode 93 will be forward biased. The slight charge remaining upon capacitor 96 will leak off through diode 93 and resistor 85 so that the capacitor 96 will be rapidly reset to zero charge and ready for the next timing cycle.

When arm 75 is at contact 80 the resistor 82 is not necessary but may serve to reduce the energy (heat) flowing through the coil. Resistor 85 and diode 93 provide a discharge path for the stored energy in the capacitor 96, from junction 91, through diode 93, lead 94 and resistor 85 to lead 71 and back to the capacitor 96. This permits a quicker recycling and a more accurate time delay than has heretofore been obtainable as the capacitor is fully discharged before the next cycle. In order to deenergize the relay, switch $S_2$ need merely be opened.

There has thus been described a new and improved time delay circuit for controlling a relay.

What is claimed as new is:

1. A time delay circuit including in combination: first and second input terminals for connection to a source of direct current potential; a relay coil, one end of said relay coil being connected to said second input terminal; multiple contact switching means associated with said relay coil, said switching means including first and second stationary contacts and a movable arm adapted to transfer from said first to said second stationary contact upon energization of said relay coil, said movable arm being coupled to said first input terminal, said second stationary contact being coupled to the other end of said relay coil; and a unijunction transistor including an emitter connection and first and second base connections, said first base connection being coupled to said second stationary contact and to said other end of said relay coil, said second base connection being coupled to said first stationary contact, said emitter connection being coupled to said first stationary contact by resistance means and to said second input terminal by capacitance means, whereby when a direct current potential is applied across said first and second input terminals, said movable arm will change contact position after a predetermined time delay determined by the time constant of the series R-C circuit formed by said resistance and capacitance means.

2. A time delay circuit including in combination: first and second input terminals for connection to a source of direct current potential with the positive terminal of said source connected to said first input terminal; a relay coil, one end of said relay coil being connected to said second input terminal; multiple contact switching means associated with said relay coil, said switching means including first and second stationary contacts and a movable arm adapted to transfer from said first to said second stationary contact upon energization of said relay coil, said movable arm being selectively coupled to said first input terminal, said second stationary contact being coupled to the other end of said relay coil; a unijunction transistor including an emitter connection and first and second base connections, said first base connection being coupled to said second stationary contact and to said other end of said relay coil, said second base connection being coupled to said first stationary contact, said emitter being coupled to said first stationary contact by first resistance means and to said second input terminal by capacitance means; and rectifier means and second resistance means connected in series across said capacitance means with the positive terminal of said rectifier means being connected to the portion of said capacitance means coupled to said emitter, the junction between said series connected rectifier means and second resistance means being connected to said first stationary contact, whereby said capacitance means will be rapidly discharged upon transference of said movable arm from said first stationary contact to said second stationary contact.

3. A time delay circuit including in combination: first and second input terminals for connection to a source of direct current potential with the positive terminal of said source connected to said first input terminal; a relay coil; one end of said relay coil being connected to said second input terminal; multiple contact switching means associated with said relay coil, said switching means including first and second stationary contacts and a movable arm adapted to transfer from said first to said second stationary contact upon energization of said relay coil, said second stationary contact being coupled to the other end of said relay coil; first rectifier means selectively coupling said movable arm to said first input terminal, the plate terminal of said first rectifier means being coupled to said first input terminal; a unijunction transistor including an emitter connection and first and second base connections, said first base connection being coupled to said second stationary contact and to said other end of said relay coil, said second base connection being coupled to said first stationary contact, said emitter being coupled to said first stationary contact by first resistance means and to said second input terminal by capacitance means; and second rectifier means and second resistance means connected in series across said capacitance means with the positive terminal of said second rectifier means being connected to the portion of said capacitance means coupled to said emitter, the junction between said series connected second rectifier means and second resistance means being connected to said first stationary contact, whereby said unijunction transistor will be protected against an inadvertent reversal of source voltage polarity and whereby said capacitance means will be rapidly discharged upon transference of said movable arm from said first stationary contact to said second stationary contact.

References Cited in the file of this patent

UNITED STATES PATENTS

| | | |
|---|---|---|
| 2,143,501 | Snyder | Jan. 10, 1939 |
| 2,433,254 | Aiken | Dec. 23, 1947 |
| 2,759,124 | Willis | Aug. 14, 1956 |
| 2,769,926 | Lesk | Nov. 6, 1956 |
| 2,780,752 | Aldrich et al. | Feb. 5, 1957 |
| 2,867,754 | O'Bleness | Jan. 6, 1959 |
| 2,906,926 | Bauer | Sept. 29, 1959 |
| 2,918,609 | Elliott | Dec. 22, 1959 |

OTHER REFERENCES

Publication: G.E. Transistor Manual, third edition, published by General Electric Co., Semiconductor Products, 1224 West Genesse Street, Syracuse, New York. Copyright July 23, 1958.